United States Patent [19]
Pinnow et al.

[11] Patent Number: 6,130,620
[45] Date of Patent: *Oct. 10, 2000

[54] REMOTE MONITORING SYSTEM

[75] Inventors: Douglas A. Pinnow, Dove Canyon; Darrell E. Flenniken, Mission Viejo, both of Calif.

[73] Assignee: Electronic Monitoring Systems, Inc., Laguna Hills, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/908,099

[22] Filed: Aug. 11, 1997

[51] Int. Cl.$^7$ .................................................. G06F 7/04
[52] U.S. Cl. ........................ 340/825.3; 340/825.34; 340/825.49
[58] Field of Search .................. 340/539, 573.4, 340/531, 825.3, 825.54, 825.36; 379/38, 39, 40, 42, 49, 50, 388

[56] References Cited

U.S. PATENT DOCUMENTS

| | | |
|---|---|---|
| 3,478,344 | 11/1969 | Schwitzgebel et al. |
| 4,011,409 | 3/1977 | Conrad ........................................ 379/38 |
| 4,495,496 | 1/1985 | Miller, III ............................ 340/825.54 |
| 4,598,272 | 7/1986 | Cox ........................................... 340/539 |
| 4,743,892 | 5/1988 | Zayle ........................................ 340/573 |
| 4,747,120 | 5/1988 | Foley ........................................ 379/38 |
| 4,812,823 | 3/1989 | Dickerson ................................ 340/572 |
| 4,843,377 | 6/1989 | Fuller et al. ............................. 340/573 |
| 4,924,211 | 5/1990 | Davies ...................................... 340/573 |
| 4,952,913 | 8/1990 | Pauley et al. ............................ 340/573 |
| 4,952,928 | 8/1990 | Carroll et al. ....................... 340/825.54 |
| 4,973,944 | 11/1990 | Maletta ..................................... 340/568 |
| 4,980,671 | 12/1990 | McCurdy .................................. 340/568 |
| 4,999,613 | 3/1991 | Williamson et al. .................... 340/573 |
| 5,023,901 | 6/1991 | Sloan et al. ............................... 379/38 |
| 5,032,823 | 7/1991 | Bower et al. ............................. 340/568 |
| 5,075,670 | 12/1991 | Bower et al. ............................. 340/573 |
| 5,103,474 | 4/1992 | Stoodley et al. .......................... 379/58 |
| 5,170,426 | 12/1992 | D'Alessio et al. ........................ 379/38 |
| 5,189,395 | 2/1993 | Mitchell ................................... 340/539 |
| 5,218,344 | 6/1993 | Ricketts ................................... 340/573 |
| 5,255,183 | 10/1993 | Katz ......................................... 364/406 |
| 5,266,944 | 11/1993 | Carroll et al. ....................... 340/825.36 |
| 5,369,699 | 11/1994 | Page et al. ................................ 379/36 |
| 5,394,136 | 2/1995 | Lammers et al. ....................... 340/439 |
| 5,396,224 | 3/1995 | Dukes et al. ....................... 340/825.49 |
| 5,448,221 | 9/1995 | Weller ..................................... 340/539 |
| 5,461,390 | 10/1995 | Hoshen .................................... 342/419 |
| 5,465,082 | 11/1995 | Chaco ................................. 340/825.54 |
| 5,489,898 | 2/1996 | Shigekusa et al. ...................... 340/988 |
| 5,497,141 | 3/1996 | Coles et al. ........................ 340/309.15 |
| 5,515,419 | 5/1996 | Sheffer ...................................... 379/58 |
| 5,537,102 | 7/1996 | Pinnow ................................ 340/825.3 |
| 5,552,772 | 9/1996 | Janky et al. ............................. 340/573 |
| 5,568,119 | 10/1996 | Schipper et al. .................... 340/325.37 |
| 5,602,903 | 2/1997 | Leblanc et al. ........................... 379/60 |
| 5,608,784 | 3/1997 | Miller ....................................... 379/88 |
| 5,610,589 | 3/1997 | Evans et al. ............................. 340/573 |
| 5,627,520 | 5/1997 | Grubbs et al. ........................... 340/572 |

OTHER PUBLICATIONS

FCC's E–911 Mandate, "A Catalyst for GPS–Enabled Location–Based Services," *SiRF Technology White Paper*, Aug. 1988, pp. 1–4.

Douglas A. Pinnow, "Electronic Monitoring Systems Introduces Watch Patrol," *Journal of Offender Monitoring*, (vol. 7, No. 1), Winter 1994.

*Primary Examiner*—Michael Tokar
*Assistant Examiner*—Jean B. Jeanglaude
*Attorney, Agent, or Firm*—Bacon & Thomas, PLLC

[57] ABSTRACT

A remote monitoring system offers both random tracking and scheduled contacts while the monitored person is away from home, and continuous signalling at home, permitting the monitored person to be monitored even while asleep, by providing a remote monitoring system which includes a home monitoring unit for receiving RF transmissions from a wrist device, but which can be self-installed by the wearer of the device. The home monitoring unit transmits periodic status reports concerning the presence of an individual at the location of the monitoring unit, but the direct telephone connection may be replaced by an Internet connection for all but urgent communications.

9 Claims, 1 Drawing Sheet

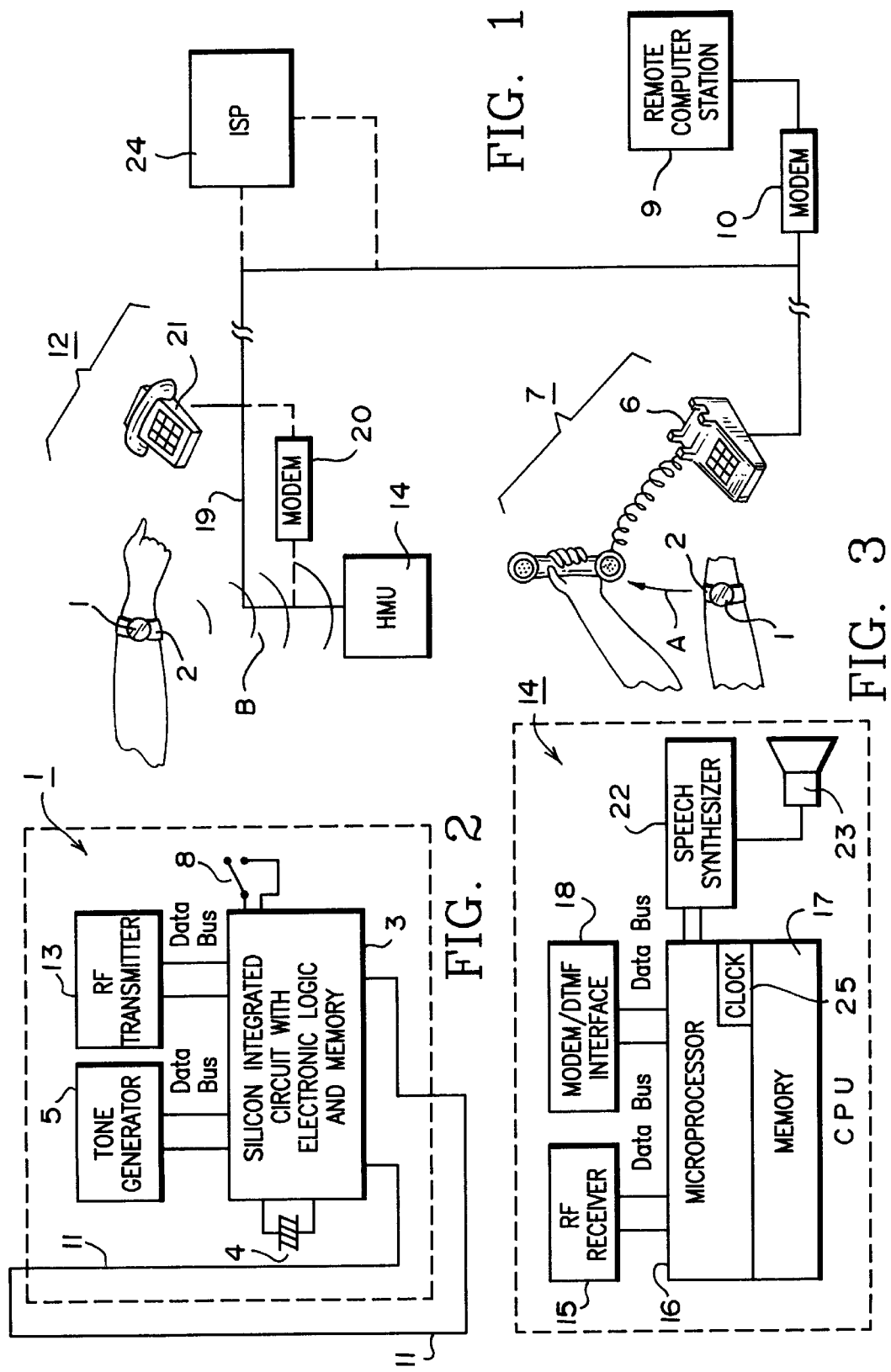

REMOTE MONITORING SYSTEM

BACKGROUND OF THE INVENTION

1. Field of the Invention

This invention relates to a system for remotely verifying the presence of a person at a particular location. More specifically, the invention relates to improvements in a remote monitoring system of the type disclosed in U.S. Pat. No. 5,537,102 (hereinafter, the EMS patent), and in particular to a remote monitoring system and method that adds a miniature RF transmitter and home monitoring unit to the tamper proof electronic device disclosed in the EMS patent. In addition, the invention relates to a system for simplifying installation of a home monitoring unit, and to a system which reduces offender monitoring costs by employing an inexpensive Internet connection between a home monitoring unit and a central monitoring station.

2. Discussion of Related Art

The device disclosed in the EMS patent, a commercial version of which is currently being offered by Electronic Monitoring Systems, Inc., is a tamper proof electronic device that is worn like a wrist watch. The currently preferred embodiment of the device described in the EMS patent, which is hereby incorporated by reference, includes a sound generator capable of emitting acoustic tones and of prompting the person wearing the device with an audible alarm, either at pre-scheduled times or at seemingly random intervals, to call a central monitoring station and establish his or her identity by holding the device to the telephone and causing the device to emit a coded sequence of tones, for transmission over the telephone line to the central monitoring station. Location of the caller is established by Caller I.D. or Automatic Number Identification (ANI).

Tampering with the wrist device is prevented by a fiber optic circuit in the wrist band, while duplication or simulation of the coded sequence of tones is prevented by changing the sequence in a pseudorandom manner, as defined in the EMS patent, at regular or pseudorandom intervals.

The device thus provides a secure way to positively track a person at any location with access to a telephone, and is therefore suitable for a variety of tracking applications including monitoring of individual offenders in court-ordered house arrest or work-release programs.

Despite the advantages of providing a self-contained monitoring unit that permits random tracking of an individual to any location with a telephone, and optionally to other locations by means of a cellular or satellite location determining system, the system disclosed in the EMS patent has a few disadvantages. In particular, if the person being monitored fails to initiate contact either at scheduled or random intervals, that person may use the excuse that he or she slept through the alarm or a wake-up call, or was otherwise occupied in such a way that the telephone could not be reached in time to initiate the required telephone call, even though the individual might actually have simply been away from the scheduled location. In addition, some jurisdictions require that an individual being monitored be permitted a certain amount of sleep at night, during which time the individual cannot be disturbed, either by the alarm or by providing wake-up calls.

One solution to the problem of non-compliance with call-in requests in situations where tampering has not occurred is to use a monitoring system of the type in which the monitored person wears a radio frequency (RF) transmitter that communicates with a monitoring unit connected to the monitored person's home telephone and is arranged to call in status reports without intervention. In theory, such monitoring systems provide for continuous monitoring of a monitored person during periods when the monitored person is required to be at home. Examples of this type of arrangement are disclosed in numerous U.S. patents, including U.S. Pat. Nos. 3,478,344, 4,598,272, 4,812,823, 4,952,913, 4,973,944, 4,980,671, 4,999,613, 5,032,823, 5,189,395, and 5,627,520, and others, and versions thereof are currently being offered by a number of companies.

Obviously, such systems have the disadvantage of not being able to provide random tracking, and it was in fact a specific objective of the system described in the EMS patent to overcome the disadvantage of RF transmitter-based systems by avoiding their use entirely. In addition, however, such systems have proven unreliable in practice, tending to generate false alarms. To avoid having to respond to isolated alerts, companies employing RF transmitter systems will not report an offender as having left his home until, for example, five to twenty coded signals in a row over the course of five to twenty minutes have not been received. Even using this strategy, there are a number of instances where the offender is really at home yet the radio transmitted signals were not received. To resolve instances such as this, the offender is often called from the central monitoring station and asked to identify himself by stating his birthday or social security number. This is clearly a marginal solution. In other instances, the central station may use voice identification to attempt to identify an offender. This is a better but still marginal method that is open to fraud. In contrast, the use of coded acoustic tones as described in the EMS patent provides a 100% reliable method for determining if the offender is present.

Not only do such systems have the disadvantages of limited tracking area and a high incidence of false alarms in comparison with the EMS system, but installation of the hardware required to implement an RF transmitter based monitoring system is relatively difficult, usually requiring an officer to enter the monitored person's home in order to establish the necessary connections, and the conventional stationary installation requires a relatively expensive direct telephone connection to the central monitoring station, usually by means of a toll-free number paid for by the monitoring service.

In spite of these problems with conventional continuous monitoring arrangements, the present invention now proposes to combine the wrist device described in the EMS patent, which can be used independently of any home monitoring unit and provides 100% reliability, with a miniature RF transmitter system, thereby obtaining a device which offers the reliability and random tracking advantages of the device described in the EMS patent, as well as the ability to monitor an individual at times while the individual is supposed to be sleeping or is otherwise indisposed.

While the lack of random tracking capabilities of RF transmitter systems has previously been recognized, the conventional approach has been to add call-in features in which identification of the caller is made based on words spoken by the caller, or on some type of voice identification software. An example of an arrangement which includes voice identification capabilities is found in U.S. Pat. No. 5,023,901, but because of the low fidelity of a voice transmitted over a telephone system, voice identification is not consistently reliable.

Instead of taking the voice recognition approach, the present invention adds a conventional RF transmitter to the tone-based wrist device described in the EMS patent to periodically send a coded signal to a radio receiver located in the home monitoring unit attached to the telephone line and electrical power in the monitored person's home. In this arrangement, as is conventional, the home monitoring unit's operation is controlled by a microprocessor that is instructed to automatically place a telephone call to a central monitoring station whenever a reportable event, such as a band tamper or failure to return at curfew time, is detected, and to periodically report to the central station to confirm that it is still connected to the telephone line and electrical power, and that no reportable event has occurred.

While this may seem to be a simple combination, however, it has never been attempted or previously proposed. One reason may be that the use of a stationary home monitoring installation directly obviates one of the advantages of the EMS system, namely the advantage of eliminating unnecessary hardware. Nevertheless, properly implemented, this disadvantage can be minimized and is far outweighed by the blanket coverage provided by the combined system of the invention. For example, the present invention provides for cost reduction both with respect to installation and during monitoring, helping to make the proposed combination practicable.

The latter advantage has to do with the fact that, while the transmission of periodic reports confirming connection of the home monitoring unit to the monitored person's home telephone line are essential to ensure that the unit will be able to report any violations, it has been found through practical experience that routine reports from the home monitoring unit to the central monitoring station need not be made in real time, and that even violation reports could, in some instances, be made with a short time delay. As a result, the present invention proposes to use an inexpensive Internet connection for most routine reports as well as some exception reports, while reserving a direct dedicated telephone connection only for certain exception reporting or other specific tasks, such as locating the home monitoring unit by caller I.D. during the setup process and for subsequent periodic checks.

In addition, the present invention addresses the problem of set-up by including a speech synthesizer to facilitate installation of the home monitoring unit. While it has previously been proposed to provide for voice prompting to guide a monitored person through a specific reporting task, the previously proposed systems all provide for the instructions to be transmitted over the airwaves or telephone network, and could not be utilized until the monitoring equipment is installed, rendering them useless for installation.

SUMMARY OF THE INVENTION

It is accordingly an objective of the invention to provide a remote monitoring system which offers both random tracking and scheduled contacts while the person being monitored is away from home, and continuous signalling at home, permitting the person to be monitored even while asleep or otherwise indisposed, and leaving the person with no excuses for failing to report-in.

It is a further objective of the invention to provide a monitored person monitoring system which includes a home monitoring unit for receiving RF transmissions from a wrist device worn by the monitored person, but which can be self-installed by the monitored person.

It is yet another objective of the invention to provide a remote monitoring system of the type in which a home monitoring unit transmits periodic status reports concerning the presence of an individual at the location of the monitoring unit, but in which the cost of establishing a communications link between the home monitoring unit and a central monitoring station are greatly reduced.

These objectives are achieved, in accordance with the principles of a preferred embodiment of the invention, by providing a remote monitoring system which employs a wrist unit of the type described in U.S. Pat. No. 5,537,102, to which is added a miniature radio frequency transmitter that will transmit a silent radio signal at all calculated alarm times, including during sleep periods, and a radio receiving unit connected to a telephone line in the monitored person's residence. The receiving unit includes a microprocessor and telephone modem so that when it first receives a coded signal from the wrist unit it can automatically make a telephone report to the central station confirming that the monitored person is present.

The objectives of the invention are further achieved by providing a remote monitoring system and method which employs a radio transmitter worn by the person being monitored and a monitoring unit arranged to monitor the radio transmitter and communicate the results of the monitoring to a central monitoring station, and in which the monitoring unit includes a speech synthesizer and speaker capable of providing installation instructions and messages to simplify set-up and operation of the system.

Finally, the objectives of the invention are also achieved by providing a remote monitoring system and method which employs a radio transmitter worn by the monitored person and a monitoring unit arranged to monitor the radio transmitter and communicate the results of the monitoring to a central monitoring station, and in which in order to provide the most cost effective monitoring system, a cost effective Internet connection is used for most routine reports as well as some exception reports while selecting a direct dedicated telephone connection only for certain exception reporting or other specific tasks, such as locating the home monitoring unit during set-up.

BRIEF DESCRIPTION OF THE DRAWINGS

FIG. 1 is a schematic diagram of a remote monitoring system constructed in accordance with the principles of a preferred embodiment of the invention.

FIG. 2 is a schematic diagram showing details of the wrist device used in the system illustrated in FIG. 1.

FIG. 3 is a schematic diagram showing an example of a home monitoring unit for use in the system of FIG. 1.

DETAILED DESCRIPTION OF THE PREFERRED EMBODIMENTS

As shown in FIGS. 1 and 2, the basic wrist device used in the preferred remote monitoring system and method includes a wrist watch-like electronic device 1 attached to the user by a band 2, and includes an integrated circuit 3 capable of calculating a code, a timer 4, and a tone generator 5 for generating tones corresponding to the calculated code. As explained above, at a scheduled time or upon signalling the person being monitored by means of an audible alarm, the wrist device is held up to the receiver of a telephone 6 or other communications device situated at an arbitrary location 7 such as the monitored person's workplace or school, the watch face is pressed to activate an internal switch 8, and the tones represented by arrow A, are transmitted over a telephone line to the central monitoring station 9 via a modem 10.

To prevent tampering, the wrist device 1 includes a circuit 11 which is established upon placement of the device on the wrist of a monitored person, and which disables, disrupts, or alters the generation of coded tones when broken. The circuit may advantageously be in the form of a fiber optic circuit, which is impossible to circumvent, although electrical circuitry could also be used. A display of the codes may optionally be included so that the monitored person can read the codes during a telephone communication, although the currently available version of the device uses coded tones, which gives less opportunity for the monitored person to study the sequences and possibly duplicate them.

As a result, validation of the identity of the person wearing the device can be carried out at any arbitrary location with access to a telephone, with the location being positively established by ANI. Further details of this arrangement, and variations which eliminate the need for access to a telephone, including arrangements with utilize a cellular network or GPS transponder, may be found in the above-cited EMS patent.

Unlike the prior wrist device, the wrist device of the preferred embodiment of the invention provides for continuous monitoring of the monitored person at his or her home, indicated by reference numeral 12, in addition to random tracking of the monitored person at arbitrary location 7, by including within the wrist device a miniature RF transmitter 13 controlled by circuit 3 and timer 4. Such transmitters are commercially available, and may be arranged to emit coded signals corresponding to the above-described pseudo-random codes, or other identifying codes, either continuously or on a programmed contact basis.

During continuous signalling, a brief code is sent once every minute or every several minutes. For example, the RF code may be transmitted in 1/7 of a second and retransmitted every 72 seconds, resulting in a duty factor of only about 1 part in 1,000, and very low battery power consumption. Programmed contact transmissions also can use a low duty cycle, but occur only at scheduled times or on an apparently random basis. In either case, the RF transmissions are preferably used during scheduled sleep or quiet periods, with the direct acoustic signalling over the monitored person's home telephone 21 being preferred at other times due to its higher reliability.

The corresponding home monitoring unit 14 includes a commercially available RF receiver 15, a microprocessor 16, a memory 17, and an interface to permit connection of the home monitoring unit to a telephone line, either via a direct connection 18 to the telephone line or via a modem connection 19, the purpose of which is described below. Although the invention is not limited thereto, a suitable RF receiver is the "Ash receiver" made by RF Monolithic, Inc. It will of course be appreciated that the term "home" can include any location where the monitored person spends a significant amount of time, including a half-way house or dormitory.

Unlike prior home monitoring units, the home monitoring unit of the preferred embodiment includes a speech synthesizer 22 and associated speaker 23 for providing voice messages to the user when appropriate, reducing problems associated with testing, monitored person enrollment, home installations, and operation. For example, the following eleven messages could be conveniently stored in an integrated circuit that has a one minute total voice storage capacity:

1. "Coded signal received" (to be used only when an officer is checking out equipment performance when initiating service);
2. "Please connect the telephone line;"
3. "Please connect the electrical power;"
4. "Telephone line is now connected;"
5. "Electrical power is now connected;"
6. "Installation is complete;"
7. "Hang up the telephone, now;"
8. "All systems check O.K.;"
9. "System problem detected. Use another HMU;"
10. "HMU is now in the enrollment mode;" and
11. "HMU is now in the monitoring mode."

Normally, the messages will be repeated one time after a short delay to ensure that they will be understood, the first iteration being to get the user's attention. Messages directed to an officer or professional installer need not be repeated.

The home monitoring unit preferably has three operating modes, similar to the existing device covered by the above-cited EMS patent, including a low power stand-by mode, an enrollment mode, and a monitoring mode. During the stand-by mode, the electrical power line and telephone cord are disconnected. While in this mode, the microprocessor conducts a periodic self-check, say every 30 seconds, to determine if the power line has been connected during the past half minute. If the power line has been connected, the home monitoring unit powers up and announces that it is in enrollment mode. Enrollment can then proceed by transmission of an RF coded signal from a wrist unit, after which the device automatically switches to monitoring mode. As a result, installation of the home monitoring unit is simplified, and the need for an ancillary device, such as a key switch, to turn the home monitoring unit on and off is eliminated.

In an especially advantageous embodiment of the invention, the routine reports from the home monitoring unit to the central monitoring station, and even some exception reports, need not be made in real time, but rather can be made over a cost effective data connection to an Internet Service Provider (ISP) 24, with the direct dedicated telephone connection being used only for certain exception reporting or other specific tasks, such as locating the home monitoring unit by caller identification (Caller ID) during installation. To this end, the home monitoring unit preferably includes an appropriate interface, including communications drivers capable of establishing an Internet connection via appropriate Internet protocols.

To accomplish this, memory 17 of the home monitoring unit is used for storing downloaded versions of the monitored person's curfew schedule and schedule revisions, which are transmitted via the home monitoring unit's modem interface 18, either by direct modem-to-modem transfer or via ISP 24. In addition, the home monitoring unit includes a real time clock 25 so that its microprocessor can compare local events based on RF signals received or not received from the monitored person's transmitter, such as the arrival and departure of the monitored person, with the stored curfew schedule to determine if an exception has occurred. So long as no exception is noted, the home monitoring unit continues to make periodic reports, at some predetermined interval such as once every hour to the central monitoring station via the ISP. If an exception is noted, the home monitoring unit is programmed to immediately report this event either by placing a direct telephone call to the central monitoring station or by calling via the ISP, if the home monitoring unit is so authorized.

In order to facilitate such a system architecture, the home monitoring unit normally is programmed with the central monitoring stations's direct telephone number which it uses to make all reports until the central station recognizes, using caller I.D. or automatic number identification (ANI) that the report call had been received from a valid enrolled home telephone number of a person who is being monitored. Once this has occurred, the central monitoring station automatically looks up the local Internet access telephone number corresponding to the monitored person's home telephone number and the selected ISP. The Internet access number is then downloaded into the home monitoring unit for subsequent use in routine reporting and for selected exception reporting.

By establishing the Internet connection from the central station, a new Internet connection can be established whenever the home monitoring unit is installed in a new monitored person's home, with the previous connection being halted. In addition, reporting via the ISP can be used in situations where the home monitoring unit is installed in locations other than the monitored person's residence, such as a half-way house or at work using one or more home monitoring units.

Those skilled in the art will appreciate that, while the concept of reducing costs by utilizing an Internet data connection to transmit reports on a delayed or periodic basis is highly advantageous in the context of the above-described system, the principle of using an Internet connection could be applied to any system employing a home monitoring unit capable of implementing the necessary software.

For example, as cellular or satellite modem links become available, the system described above can be extended to monitoring mobile monitored persons who are being tracked by Global Positioning Satellite (GPS) or other means. In addition, the RF transmitter can use frequencies other than radio frequencies, such as infrared.

Having thus described various preferred embodiments of the invention, those skilled in the art will appreciate that variations and modifications of the preferred embodiment may be made without departing from the scope of the invention. It is accordingly intended that the invention not be limited by the above description or accompanying drawings, but that it be defined solely in accordance with the appended claims.

What is claimed is:

1. A monitoring system, comprising:
  a monitoring unit having a communications link to a central monitoring station;
  a device arranged to be worn by a person,
    wherein said device arranged to be worn by a person includes a radio transmitter arranged to communicate by radio with the monitoring unit,
    wherein said device arranged to be worn by a person further includes processor means for calculating a code; and
    wherein said device arranged to be worn by a person further includes means for converting said code into a format in which the code can be directly communicated to the central monitoring station over an existing communications medium without using the radio transmitter, without intervention by the monitoring unit, and without use of said communications link between the monitoring unit and the central monitoring station,
    wherein said monitoring unit is arranged to determine, based on receipt of communications from said radio transmitter, whether a person wearing said device is within range of said monitoring unit, and to automatically report to the central monitoring station a result of said determination, and
    wherein said code converting means enables the code to be communicated to the central monitoring station directly over the existing communications medium when the device is out of range of the monitoring unit.

2. A system as claimed in claim 1, wherein said transmitter is an RF transmitter arranged to transmit RF signals to the monitoring unit when the transmitter is within range of the monitoring unit, thereby providing for continuous monitoring of the person wearing the device so long as the person is scheduled to be within range of the monitoring unit.

3. A system as claimed in claim 2, wherein said transmitter is arranged to transmit RF signals to the monitoring unit continuously.

4. A system as claimed in claim 2, wherein said transmitter is arranged to transmit RF signals to the monitoring unit at random intervals during scheduled sleep periods of the person wearing the device, and wherein said means for converting said code into a format for direct transmission to the central monitoring station comprises a tone generator arranged to generate a sequence of tones corresponding to said code for transmission to the central monitoring station over the telephone line when the device is held up to a telephone receiver in order to monitor said person wearing the device at times other than said scheduled sleep periods.

5. A system as claimed in claim 2, wherein said means for converting said code into a format for direct transmission to the central monitoring station comprises a tone generator arranged to generate a sequence of tones corresponding to said code, whereby when the device is held up to a telephone receiver, the sequence of tones is transmitted directly to the central monitoring station over the telephone line, and whereby a location of the caller can thereby be determined using automated number identification, to provide random tracking of the person wearing the device in addition to said continuous monitoring.

6. A system as claimed in claim 1, wherein the monitoring unit further comprises means including a speech synthesizer and speaker for communicating installation instructions to a person installing the monitoring unit.

7. A system as claimed in claim 1, wherein said monitoring unit is connected to the central monitoring station by an Internet data connection.

8. A system as claimed in claim 1, wherein said monitoring unit is connected to the central monitoring station by a direct telephone connection.

9. A system as claimed in claim 1, wherein said monitoring unit is connected to the central monitoring station by both a direct telephone connection and an Internet data connection.

* * * * *